Jan. 11, 1955  F. N. LEE ET AL  2,698,953
MACHINE FOR APPLYING HEEL BREAST COVERING FLAPS TO SHOES
Filed Aug. 22, 1952  4 Sheets-Sheet 1

Inventors
Ferman N. Lee
Harold G. Shaw
Hammond P. Diggle
By their Attorney

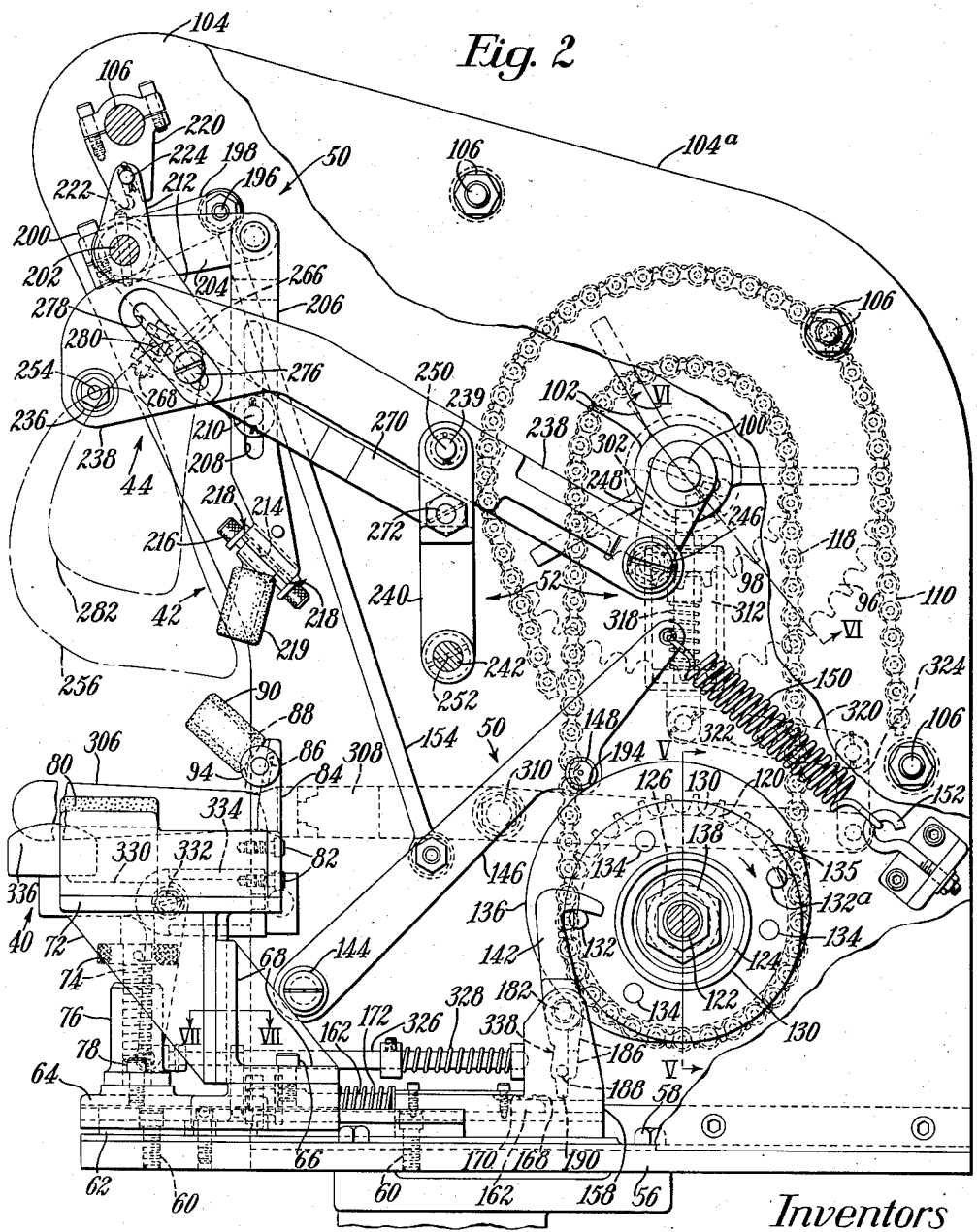

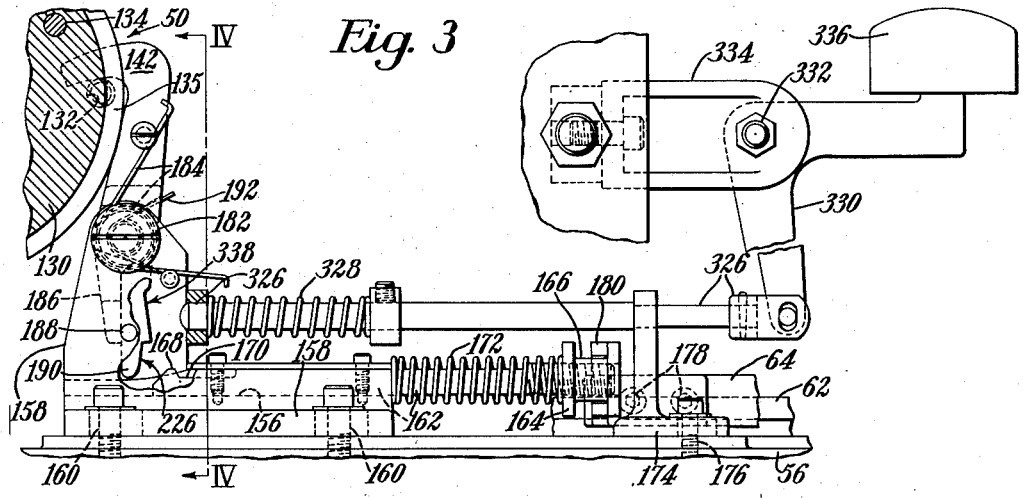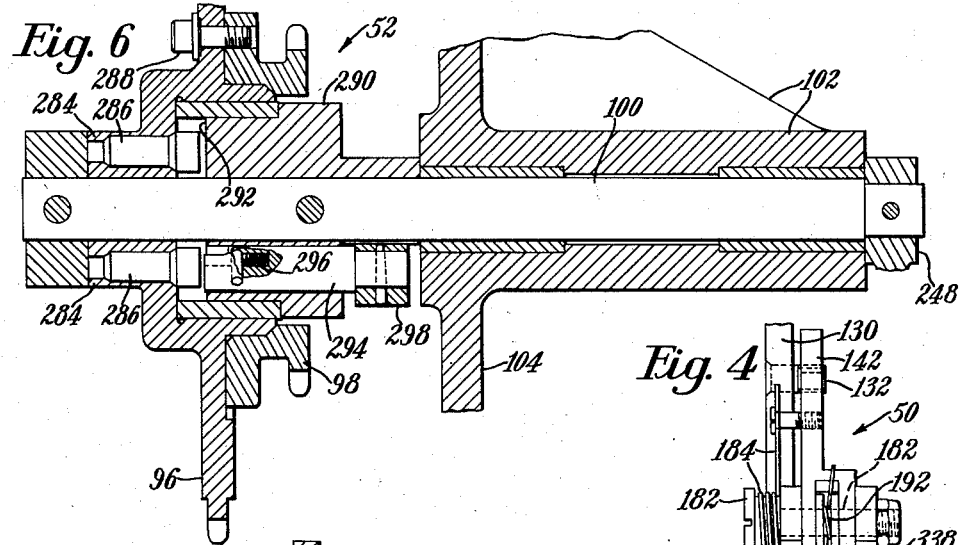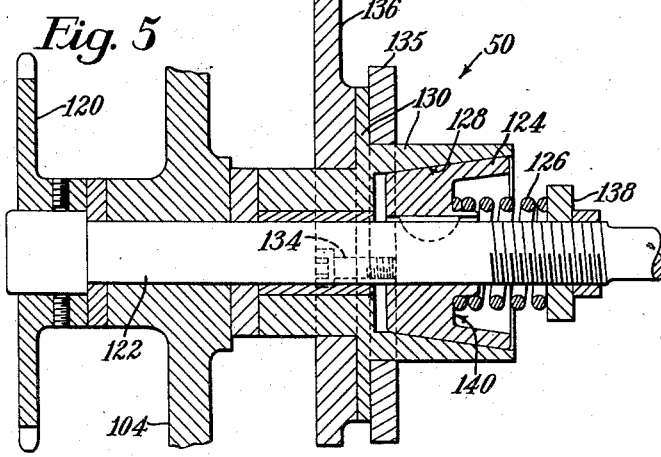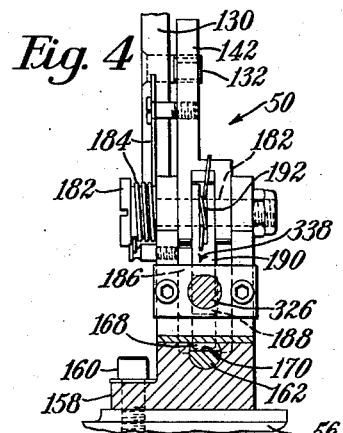

Jan. 11, 1955 F. N. LEE ET AL 2,698,953
MACHINE FOR APPLYING HEEL-BREAST COVERING FLAPS TO SHOES
Filed Aug. 22, 1952 4 Sheets-Sheet 4
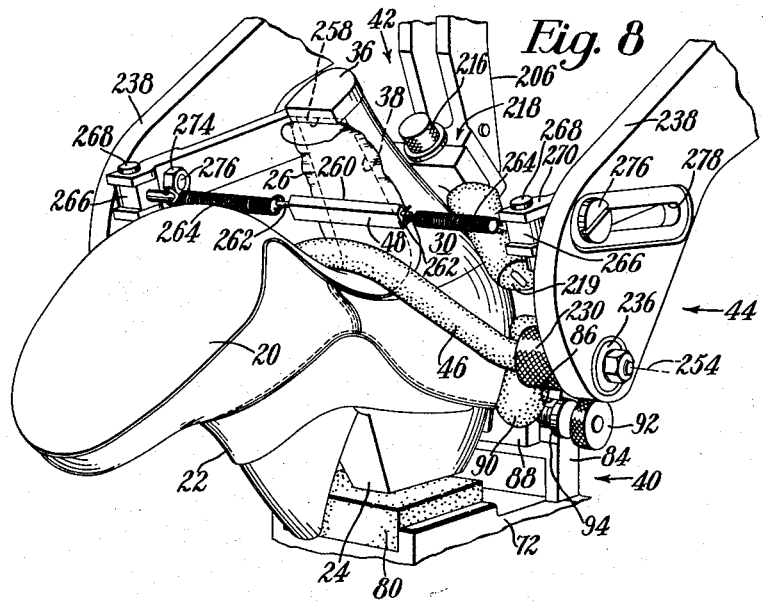
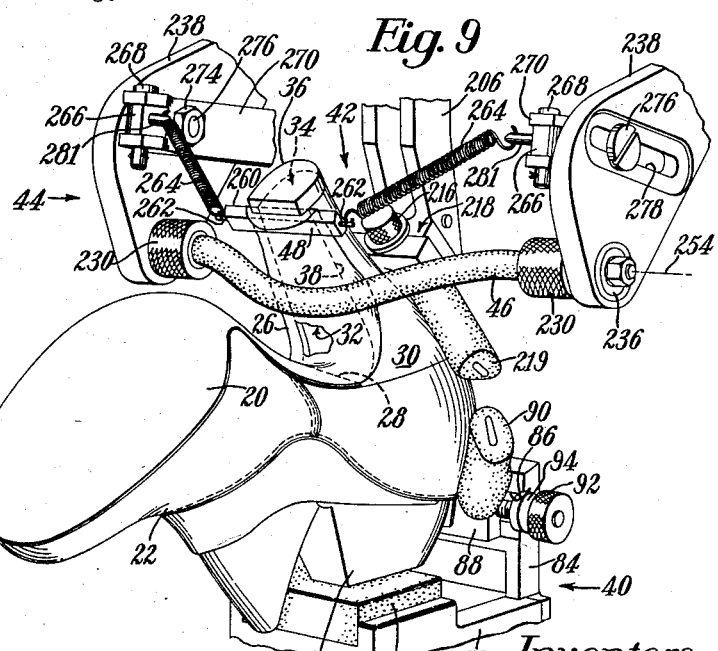
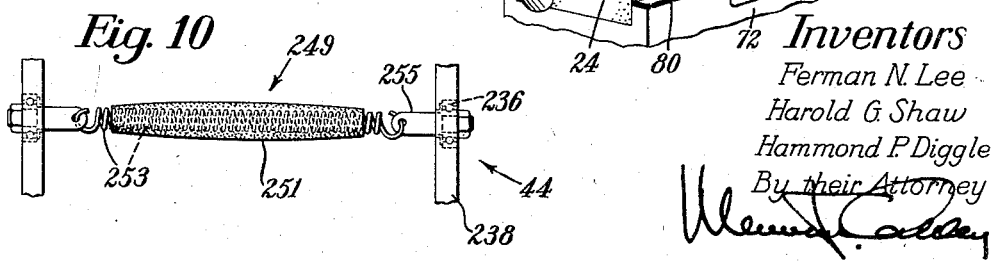
Inventors
Ferman N. Lee
Harold G. Shaw
Hammond P. Diggle
By their Attorney

United States Patent Office 2,698,953
Patented Jan. 11, 1955

2,698,953

MACHINE FOR APPLYING HEEL BREAST COVERING FLAPS TO SHOES

Ferman N. Lee, Danvers, and Harold G. Shaw and Hammond P. Diggle, Beverly, Mass., assignors to United Shoe Machinery Corporation, Flemington, N. J., a corporation of New Jersey Application August 22, 1952, Serial No. 305,786

17 Claims. (Cl. 12—16.2)

This invention relates to machines for use in the manufacture of shoes and is illustrated as embodied in an improved machine for applying, to the attached outsoles of shoes and to the breasts of heels attached to said shoes, heel breast covering flaps split from said outsoles.

The present invention consists in the novel improvements hereinafter described, reference being had to the accompanying drawings which illustrate one embodiment of the invention selected for purposes of illustration, said invention being fully disclosed in the following description and claims.

In the drawings,

Fig. 2 shows the machine partly in side elevation and partly in section on line II—II of Fig. 1;

Fig. 3 is a view on line III—III of Fig. 1 of mechanism for controlling a friction clutch of the machine;

Fig. 4 is a view on line IV—IV of Fig. 3 showing in detail a latch forming part of the friction clutch controlling mechanism illustrated in Fig. 3;

Fig. 5 is a section on line V—V of Fig. 2 showing portions of the friction clutch;

Fig. 6 is a section on line VI—VI of Fig. 2 showing portions of a pin clutch forming part of a main drive of the machine;

Fig. 7 is a view on line VII—VII of Fig. 2;

Figs. 8 and 9 are views illustrating two stages respectively in the application of a heel breast covering flap to a shoe by the use of the illustrative machine; and Fig. 10 is a front view of a modified rubber roll which may be substituted for a rubber roll forming part of the flap applying mechanism illustrated in Figs. 1, 8 and 9.

Figure 1:
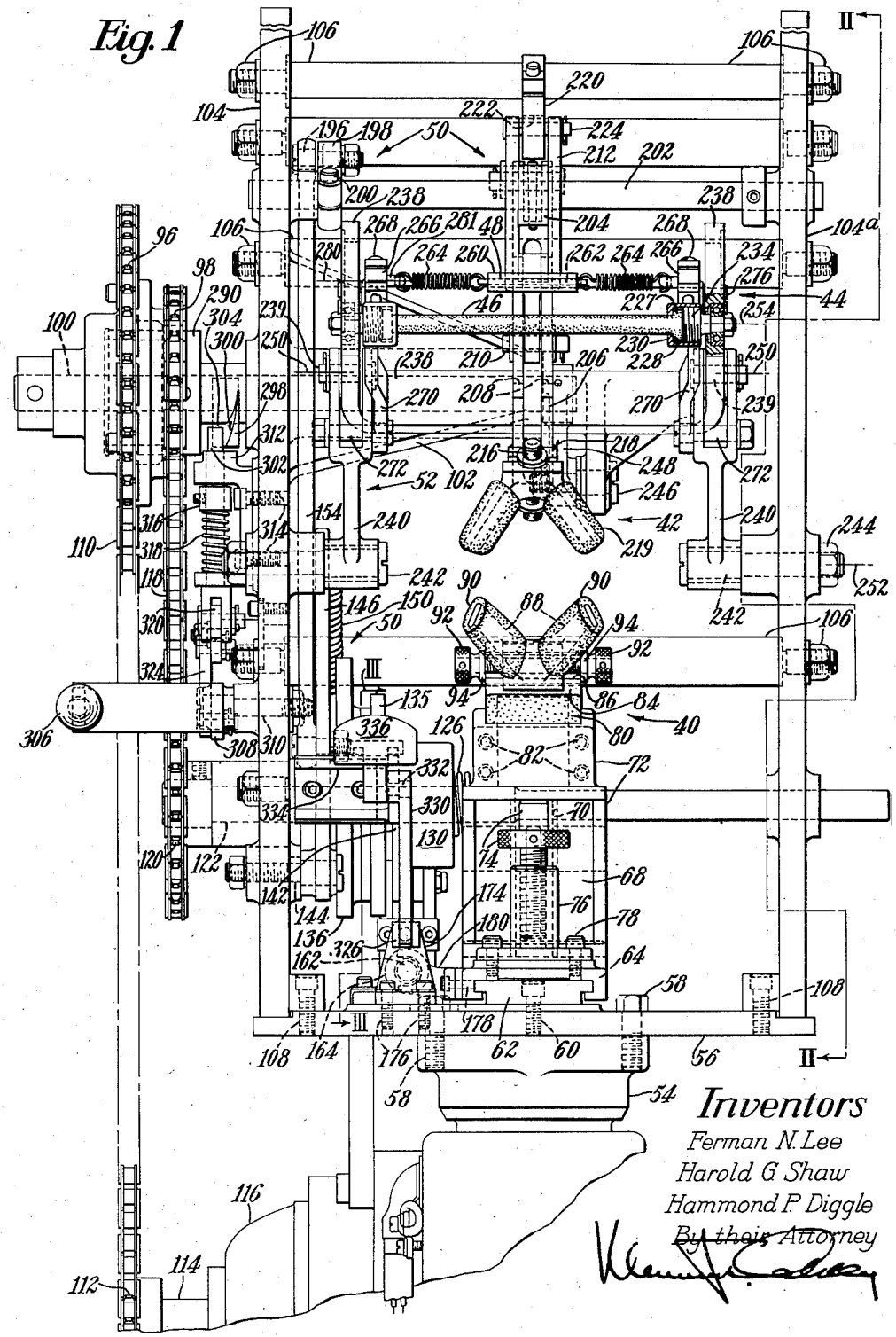
Fig. 1 is a front view, partly broken away, of the illustrative machine.
Figure 1:

In the manufacture of shoes it is common practice to split from the heel end of an outsole 20 (Figs. 8 and 9), before the attachment of said outsole to a shoe 22 mounted upon a last 24, a heel breast covering flap 26 by a cut which extends a considerable distance forward of a heel breast line 28 (Fig. 9) of the outsole. After the outsole 20 and a heel 30 have been attached to the shoe 22, it is common practice to apply the flap 26, by the use of rubber cement, to the shank of the outsole and to the breast 32 of the heel by hand and by the use of a rubber stick and boning tool. After applying the flap 26 to the outsole 20 and to the heel 30 of the shoe, the flap is trimmed flush with the top lift receiving face 34 and accordingly a top lift 36 of the heel, the lateral margins of said applied flap being trimmed flush with the breast edges 38 of the heel in a separate operation.

The illustrative machine will be described with reference to applying the flap 26 to the shank or shank portion of the outsole 20 and to the breast 32 of the attached heel 30 of the shoe 22 and comprises a jack 40 (Figs. 1, 2, 8 and 9) for the shoe 22 upon the last 24, a clamp 42 which bears against the back of the heel of the shoe for forcing the shoe against the jack, a holder or carrier 44 for a roll or applicator 46, which is made of rubber or other resilient material, and for a boning tool 48, driving mechanism 50 for operating the clamp 42, and a drive 52 (Figs. 1, 2 and 6) for operating the carrier 44 to cause the roll 46 and the boning tool 48 to move respectively in orbital or closed paths to apply the flap 26 to the shank of the outsole 20 and to the breast 32 of the heel 30 of the shoe 22.

The illustrative machine is mounted upon a stand 54 (Fig. 1) and comprises a platform 56 which is secured by screws 58 to the stand and has secured to it by screws 60 a T-shaped guide 62 upon which a slide 64 of the jack 40 is mounted. Adjustably secured by screws 66 (Fig. 2, only one shown) to the slide 64 is an angular block 68 (Figs. 1, 2 and 7) having a vertical dovetail slot 70 in which is mounted a vertical work support 72, said support being held in the desirable vertical position by a post 74 which is threaded into a pedestal 76 secured by screws 78 to the slide 64. The support 72 has at its forward upper portion a hard rubber insert 80 constructed and arranged to be engaged by the cone of the last 24 and has secured by screws 82 to its rear end a holder 84 provided with a transverse dovetail guideway 86 in which fits slidingly a bifurcated back gage 88 comprising rubber sleeves 90. The back gage 88 may be adjusted into different transverse operative positions along the guideway 86 by the use of a screw 92 threaded into the back gage and having opposed flanges 94 which engage opposite side faces of the holder 84. Movement of the support 72 into different heightwise operating positions may be effected by rotating the post 74, the support being held by gravity in engagement with the upper end of the post.

Power for operating the machine is supplied by sprockets 96, 98 (Figs. 1, 2 and 6) which are secured together and which are journaled upon a shaft 100 rotatably mounted in a transversely arranged bearing bracket 102 forming part of a main frame comprising side plates 104, 104a secured together by tie rods and nuts 106 and secured by screws 108 (Fig. 1) to the platform 56. When the machine is power operated the sprockets 96, 98 are rotated continuously as a unit by a chain 110 driven by a sprocket 112 (Fig. 1) secured to the shaft 114 of an electric motor 116 secured to the stand 54. The sprocket 98 is operatively connected by a chain 118 to a sprocket 120 (Figs. 1, 2 and 5) secured to the outer end of a shaft 122 which is rotatable in bearings of the side plates 104, 104a and forms part of the driving mechanism 50 of the heel clamp 42.

Splined for rotation with and movable to a slight extent lengthwise of the shaft 122 is a frusto-conical actuator 124 (Figs. 2 and 5) constantly urged by a spring 126 to the left, as viewed in Figs. 1 and 5, against a complemental surface 128 of a collar 130 which, when the machine is idle but powered, is held against rotation upon the shaft 122 by mechanism hereinafter described and which when released by said mechanism is frictionally driven by the actuator. Secured to the collar 130 are a pair of laterally projecting studs 132, 132a and secured by screws 134 and an annulus 135 to the collar is a cam 136. The spring 126 has its outer end in engagement with a spring retaining nut 138 threaded onto the shaft 122 and has its inner end in engagement with a surface 140 (Fig. 5) of the frusto-conical actuator 124. When the machine is powered the collar 130, by reason of the forcing of the frusto-conical actuator 124 against the surface 128 of the collar 130 by the action of the spring 126, is rotated when a latch 142 is released from one or the other of the studs 132, 132a as will be hereinafter described. The frusto-conical actuator 124 and the collar 130 may be described as forming part of a friction clutch which is engaged upon withdrawal of the latch 142 from one or the other of the studs 132, 132a.

Pivotally mounted upon a shoulder screw 144 (Figs. 1 and 2) secured to the side plate 104 is a lever 146 having rotatably mounted on it a roll 148 (Fig. 2) which bears upon the cam 136 and is constantly urged toward said cam by a spring 150 front and rear ends of which are attached to the lever and to a hook 152 secured to the side plate 104. Pivotally connected to the lever 146 is a link 154 through which, and other mechanism hereinafter described, the heel clamp 42 is operated.

Slidable in a guideway 156 (Fig. 3) of a bracket 158 secured by screws 160 to the platform 56 is a trip bar 162 upon the forward end of which is threaded a collar 164 (Figs. 1 and 3) having formed in it a circumferential groove 166, the upper rear portion of said bar having formed on it a tooth 168 (Figs. 2, 3 and 4) which forms a notch 170 with other portions of the bar. The bar 162 is constantly urged forward by a spring 172 which is interposed between the bracket 158 and the collar 164, forward movement of the bar being limited by the engagement of the collar with a lug 174 (Figs. 1 and 3) adjustably secured by screws 176 to the platform 56. Secured by screws 178 to the jack slide 64 is a bifurcated finger 180 which partially encircles the groove 166 of the collar 164, and which is narrower than said groove and is adapted to move the bar 162 rearward with lost motion in response to rearward movement of the jack slide 64, thereby causing, through mechanism hereinafter described, the latch 142 to swing counterclockwise as viewed in Fig. 2 (clockwise as viewed in Fig. 3), to withdraw the latch way from the stud 132 and thus to allow the collar 130 and accordingly the cam 136 to be rotated into a position in which the spring 150 acting upon the lever 146 and upon other mechanism hereinafter described, forces the clamp 42 against the rear face of the heel 30 of the shoe 22 mounted upon the jack 40 moved rearward, thereby limiting rearward moving of the jack and clamping the work against said jack under substantial pressure.

The latch 142 is fulcrumed upon a bearing pin 182 secured to the bracket 158 and is constantly urged clockwise as viewed in Fig. 2 by a torsion spring 184 one end of which is in engagement with a screw secured to the latch and the other end of which is in engagement with a screw secured to the bracket, clockwise movement of the latch upon the bearing pin being limited by the engagement of a depending arm 186 of the latch with a stop 188 secured to the bracket 158. The depending arm 186 of the latch 142 is normally engaged by a finger 190 which is mounted upon the bearing pin 182 between bifurcations of the latch 142 and is constantly urged clockwise, as viewed in Fig. 3, on the pin 182 by a torsion spring 192 which is considerably weaker than the torsion spring 184.

When the machine is idle the collar 130 is held in a position in which a high point 194 (Fig. 2) of the cam 136 has forced the lever 146 counterclockwise as viewed in Fig. 2 against the action of the spring 150, the clamp 42 being in a raised position and the latch 142 being in engagement with the stud 132 thereby preventing rotation of the collar 130 and accordingly rotation of the cam 136 as the frusto-conical actuator 124 is rotated.

The link 154 is pivoted upon a bearing pin 196 (Figs. 1 and 2) carried by a split arm 198 clamped by a screw 200 to the left end of a shaft 202 rotatably mounted in bearings of the side plates 104, 104a. Pinned to the central portion of the shaft 202 is an arm 204 pivotally connected to a clamp carrier 206 having elongated slots 208 in which fits a pin 210 carried by the rear end of a bell crank lever 212 journaled on the shaft 202. Formed in the lower end of the clamp carrier 206 is a dovetail guideway 214 (Fig. 2) in which is slidable the clamp 42 which has the form of a fork and has threaded into it a screw 216, flanges of said screw being in engagement respectively with faces 218 of the carrier. In order to insure against marking the heel the work engaging portions of the fork are made of rubber and have the form of sleeves 219. The bell crank lever 212 may be set in different angularly adjusted positions upon the shaft 202 to vary the path of movement of the clamp 42 in accordance with the type of work being operated upon, by angularly setting in different positions upon an associated tie rod an arm 220 which has formed in it a notch 222 for receiving a pin 224 mounted in the bell crank lever 212. When the shoe positioned upon the jack 40 is slid rearward by the operator on the T-shaped guide 62, the tooth 168 of the trip bar 162 engages a face 226 (Fig. 3) of the finger 190 and rotates the latch 142 counterclockwise, as viewed in Fig. 2, about the bearing pin 182, thereby allowing the collar 130 to rotate clockwise as viewed in Fig. 2 with the frusto-conical actuator 124, the lower end of the finger 190, after the tooth 168 has moved rearward of said finger, swinging into the notch 170 thereby enabling the latch to move under the action of the spring 184 and against the action of the spring 192 to its active position to be engaged by the stud 132a after the collar has rotated approximately 210°. The result of such action is that the rotation of the collar 130 ceases when it reaches an active position in which the cam leaves the roll and allows the clamp to be moved into engagement with the heel by the action of the spring 150.

The rubber roll 46 has at its opposite ends flanges 227 (Fig. 1) which are pressed against shoulders 228 of sleeves or rotors 230 by screws 234 formed integral with journals rotatably supported in ball bearings 236 which are carried by the forward lower portions or bifurcations of a yoke 238 forming part of the carrier 44. The yoke 238 is pivotally connected by pivot pins 239 to a pair of arms 240 which are fulcrumed upon bearing pins 242 secured by nuts 244 (Fig. 1) to the side plates 104, 104a, said yoke having a rearwardly extending flange operatively connected by a coupling pin 246 to a crank 248 pinned to the outer end of the shaft 100. When the crank 248 is rotated the yoke 238 swings simultaneously about shiftable and fixed axes 250, 252 respectively of the pins 239, 242, a common axis 254 of the sleeves 230 moving in an orbital path 256 thus causing the rubber roll 46 to force the flap 26 progressively against the shank portion of the outsole 20 of the shoe 22 and against the breast 32 of the heel 30 of the shoe, the roll during such action being flexed about and forced with combined rolling and dragging or wiping action against the flap. If desirable the rubber roll 46 may have substituted for it a rubber roll or applicator 249 (Fig. 10) having embedded in it a spring 253 opposite ends of which are coupled to rotors 255 journaled in the ball bearings 236.

In order to insure that the flap 26 shall be effectively tucked into the angle 258 (Fig. 8) formed between the lower or tread end portion of the breast 32 of the heel 30 and a portion of the top lift 36 projecting beyond or forward of said breast, the illustrative machine is provided with the boning tool 48 which is made of steel and has a longitudinal edge or ridge 260 (Figs. 1, 8 and 9) which is formed by two faces of the tool inclined at an acute angle to each other and which may be forced against the flap and be wiped progressively toward the end of the flap. The boning tool 48 is rotatably supported upon a rod 262 having its opposite end portions attached to the inner ends of springs 264 which may be referred to as connectors and have their outer ends attached to couplings 266 journaled on pins 268 carried by forward bifurcated portions of arms or links 270 pivotally mounted upon pins 272 carried by the arms 240. The links 270 and the couplings may be considered parts of the carrier. The boning tool 48 is so pivoted on the rod 262 that when the machine is idle it will swing by gravity into its position shown in Fig. 1, the edge 260 at such time being arranged effectively to apply the flap to the shoe. Secured by nuts 274 to the arms 270 are shoulder or guide screws 276 slidable in guideways 278 which are formed in the yoke 238. During one complete revolution of the crank 248 an axis 280, extending transversely of the machine and generally lengthwise of stud portions 281 of the couplings 266 in their rest positions shown in Fig. 1, moves in an orbital path 282 which is of the proper shape to insure that in operating upon shoes of different sizes and/or styles the boning tool 48 shall not interfere with the rubber roll 46 and shall lead said roll along the loose end portion of the flap 26. During the cycle of the crank 248 the boning tool 48 commonly engages the flap 26 in the vicinity of the central heightwise portion of the breast of the heel, the edge 260 of the tool being forced against and toward the end of the flap which is thereafter forced by said edge into the angle 258 (Fig. 8) formed between the breast 32 of the heel and the forwardly projecting portion of the top lift 36 of the heel. When the yoke 238 has been moved into a position in which the axis 280 has moved a substantial distance above the heel positioned and clamped in the machine, the springs 264 yield substantially and the boning tool then rolls over the projecting portion of the top lift 36 and thereafter assumes its idle position with relation to the couplings 266.

The sprocket 96 has a sleeve portion 284 (Fig. 6) which is journaled upon the shaft 100 and has secured to it a pair of pins 286 and which forms part of a one-revolution clutch and is secured to the sprocket 98 by screws 288 (only one shown). Pinned to the shaft 100 is a block 290 which is spaced from the sleeve portion 284 of the sprocket 96 to form a recess 292 and in which is slidable a plunger 294 constantly urged toward said recess by a spring 296. The plunger 294 has pinned to it a cam 298 which is slidable in the block 290 and has a face 300 (Fig. 1) normally engaged by a vertical pin 302. When the pin 302 is depressed, by mechanism hereinafter described, the cam 298 and the plunger 294 are moved as a unit to the left as viewed in Fig. 6 by spring action causing the plunger to move into the recess 292 and to be engaged by one of the pins 286 thereby rotating the shaft 100 in response to rotation of the sprocket 96 and accordingly effecting rotation of the crank 248. When the pin 302 is released it is raised by spring action, the cam 298 as it is rotated engaging said pin and causing the plunger 294 to be moved against the action of the spring 296 to its idle position shown in Fig. 6 thereby disengaging the clutch, and the shaft 100 coming to rest when a shoulder 304 (Fig. 1) of said cam engages the pin.

The pin 302 is depressed to effect engagement of the clutch by manually depressing a handle 306 (Figs. 1 and 2) of a lever 308 which is journaled upon a shoulder screw 310 threaded into the side plate 104. The pin 302 is slidingly mounted in vertical guideways of a bracket 312 secured by screws 314 to the side plate 104 and has secured to it a collar 316, there being interposed between the collar and the bracket a spring 318 for constantly urging the pin to its raised idle position. Pivotally connected to the lower end of the pin 302 is a lever 320 which is journaled upon a bearing pin 322 mounted upon the side plate 104, the levers 308 and 320 being operatively connected by a link 324.

After the flap 26 has been laid upon the shank or shank portion of the outsole 20 of the shoe 22 and upon the breast 32 of the Louis heel 30, the friction clutch is rendered effective further to move the cam 136 to its starting position by manually moving rearward a trip rod 326 which is slidingly mounted in guideways of the bracket 158 and the lug 174 and is normally forced toward its forward or idle position by a spring 328. The trip rod 326 is operatively connected to a bell crank lever 330 which is journaled on a fulcrum pin 332 secured to a bracket 334 fixed to the side plate 104, said lever being provided with a hand engaging pad 336. Depression of the pad 336 and accordingly rearward movement of the rod 326, which engages a face 338 of the finger 190, causes the latch 142 to swing counterclockwise as viewed in Fig. 2 (clockwise as viewed in Fig. 3) away from the stud 132a and allows the collar 130 to rotate clockwise (Fig. 2) until the stud 132 engages the latch, which is in waiting position to be engaged by said stud, it being the practice for the operator to release the pad 336 as soon as it has been depressed. As the collar 130 is rotated approximately 150° the cam 136 engages the roll 148 and moves the lever 146, against the action of the spring 150, to its rest position, thereby causing the heel clamp 42 to be raised to its starting or idle position shown in Figs. 1 and 2. After the heel clamp 42 has been released the jack 40 is slid forward and the shoe is removed from the jack.

Having described our invention, what we claim as new and desire to secure by Letters Patent of the United States is:

1. In a machine for applying heel breast covering flaps to shoes, means for positioning and clamping a shoe having an attached heel and a flap which is split from the outsole of the shoe, a carrier, a resilient applicator which is rotatably mounted upon the carrier, and power means for operating said carrier to cause the applicator to move in an orbital path portions of which extend generally lengthwise of the shank of the outsole of the shoe and generally lengthwise of the breast edges of the heel to cause said applicator to conform to said shank and to the breast of the heel and to roll, under considerable pressure and with some wiping action, over the flap to apply a portion of the flap to the shank of said outsole and to apply another portion of the flap to said breast of the heel.

2. In a heel covering machine, means for supporting a shoe, a carrier, a resilient applicator having opposite ends which are rotatably mounted in the carrier, and power means for operating the carrier to move said ends of the applicator bodily in orbital paths to cause said applicator progressively to force a heel breast flap split from the outsole of the shoe against the shank of the outsole and against the breast of the heel of the shoe with a combined rolling and wiping action.

3. In a heel covering machine, means for supporting a shoe, a carrier having bifurcations, a resilient applicator which is supported by and is suspended between the bifurcations of the carrier, and power means for effecting orbital motion of the carrier to cause said applicator to move bodily in a closed path to apply a heel breast flap split from the outsole of the shoe against the shank of the outsole and against the breast of the heel of the shoe.

4. In a machine for use in the application of heel breast covering flaps to shoes, means for supporting a shoe, a carrier, a rubber roll having opposite ends which are rotatably mounted upon the carrier, and power means for operating the carrier bodily to move said ends of the roll in orbital paths at opposite sides of the shoe, portions of which paths extend generally lengthwise of the shank of the outsole of the shoe and other portions of which extend generally lengthwise of the breast edges of the heel of the shoe thereby to apply the flap to the shoe.

5. In a machine for applying heel breast covering flaps to shoes, means for positioning and clamping a shoe having an attached heel and a flap which is split from the outsole of the shoe, a carrier, spaced rotors which are mounted for free rotation in the carrier about a common axis, a resilient roll opposite end portions of which are secured to said rotors, and power means for moving said carrier simultaneously about spaced parallel axes to move said rotors in orbital paths at opposite sides of the shoe, portions of which paths extend generally lengthwise of the shank of the shoe, to cause a portion of the flap to be applied to said shank and other portions of which paths extend generally heightwise of the heel to cause another portion of the flap to be applied to the breast of the heel.

6. In a machine for applying heel breast covering flaps to shoes, means for positioning and clamping a shoe which has an attached heel and has a flap split from the outsole of the shoe, a carrier having bifurcations, sleeves which are journaled respectively for free rotation in said bifurcations, a resilient roll opposite ends of which are secured to said sleeves, and powered carrier operating means for moving said sleeves in orbital paths extending respectively rearward along the opposite sides of the shank of the outsole of the shoe and then toward the tread end of the heel to apply the flap to said shank and then to the breast of the heel.

7. In a machine for applying heel breast covering flaps to shoes, a frame, means for positioning and supporting a shoe having an attached heel and an outsole from which a flap has been split, a pair of spaced parallel arms pivotally mounted upon the frame for movement about an axis, a carrier pivotally mounted upon the arms about a movable axis which is parallel to and is spaced a substantial distance from said axis, an elongated resilient roll opposite ends of which are supported for rotation upon the carrier, a crank pivotally connected to the carrier, means for operating the crank to move the carrier simultaneously about said axes to cause opposite ends of the roll to be moved in orbital paths to force the roll with a combined rolling and wiping action against said flap to apply said flap progressively to the shank of the outsole of the shoe and to the breast of the heel.

8. In a machine for applying heel breast covering flaps to shoes, a frame, means for positioning and supporting a shoe having an attached heel and an outsole from which a flap has been split, a pair of spaced parallel arms pivotally supported upon the frame for movement about an axis, a carrier which comprises spaced bifurcations and which is pivotally mounted upon said arms for movement about a shiftable axis which is parallel to and spaced a substantial distance from said axis, an elongated resilient roll opposite ends of which are rotatably mounted on said bifurcations, a crank pivotally connected to the carrier, a pair of slots formed in said bifurcations, a pair of links which are pivotally connected to said arms and are slidingly mounted in said slots, couplings mounted on the links, a boning tool yieldingly connected to said couplings, and means for operating the crank to move the carrier about said axes and accordingly to move opposite ends of the roll in orbital paths and the couplings in other orbital paths to cause the roll and the boning tool to apply the flap to the breast of the heel.

9. In a machine for applying heel breast covering flaps to shoes, a movable support for a shoe, a clamp operative against the heel of the shoe to clamp the shoe against the support, spring actuated means for constantly urging the clamp toward the support, a cam operative against said means for moving the clamp against the action of said spring actuated means to an idle position away from the support, means responsive to movement of said support for operating said cam to cause the clamp to be forced against the heel of the shoe, and a rotatable resilient roll having opposite ends which are bodily movable in orbital paths portions of which extend generally lengthwise of the shank of the shoe and other portions of which extend generally lengthwise of the breast edges of the heel to apply to the outsole of the shoe and to the breast of the heel a heel breast covering flap which is split from the outsole.

10. In a machine for applying heel breast covering flaps to shoes, means for supporting a shoe, a carrier, a resilient applicator and a boning tool which are mounted upon the carrier, and means for operating the carrier to move respectively said applicator and tool in orbital paths to apply the flap to the shoe.

11. In a machine for applying heel breast covering flaps to shoes, means for positioning and clamping a shoe having an attached heel and a flap which is split from the outsole of the shoe, a carrier, a rubber roll which is journaled for rotation upon the carrier, a boning tool which is yieldingly mounted upon the carrier, and means for moving the carrier simultaneously about two spaced axes to move said roll and said tool in different orbital paths to apply said flap to the shank of the outsole and to the breast of the heel of the shoe.

12. In a machine for applying heel breast covering flaps to shoes, means for positioning and clamping a shoe, a bifurcated carrier having a pair of slots, arms which are pivotally connected to said carrier and are pivoted for movement about a fixed axis, a crank for operating the carrier, links which are pivotally connected to said arms and are slidable in said slots, couplings mounted upon said links, a rubber roll opposite ends of which are journaled in the carrier, a boning tool having an edge, a rod upon which the boning tool is mounted for swinging movement, springs connecting opposite ends of the rod and the couplings, and means for rotating the crank to cause the roll and the boning tool to move respectively in orbital paths to apply a flap to the shank portion of the outsole of the shoe and to the breast of the heel of said shoe.

13. In a flap applying machine, a support for a shoe, a carrier, a rigid boning tool having an edge formed by two faces inclined at an acute angle to each other, a rod upon which the tool is journaled, a pair of yieldable connectors opposite ends of which are attached respectively to the rod and to the carrier, and means for moving the carrier in an orbital path to cause said edge of the tool to wipe the end portion of a heel breast covering flap, which is split from the outsole of said shoe, against the tread end portion of the breast of the heel of the shoe and into the angle formed by said tread end portion and a projecting portion of a top lift of the heel.

14. In a flap applying machine, a support for a shoe, a carrier, a bonding tool having an edge formed by two faces inclined at an acute angle to each other, a rod upon which the tool is journaled, a pair of springs inner ends of which are attached to the rod and outer ends of which are attached to the carrier, and means for moving the carrier simultaneously about two parallel axes to move the tool in an orbital path and thus to cause said edge of the tool to wipe the end portion of a heel breast covering flap, which is split from the outsole of the shoe, against the breast of the heel of the shoe and into the angle formed by said breast and a projecting portion of the top lift of said heel, said tool being constructed and arranged to swing by gravity into a position in which said edge of the tool will effectively apply the flap to said heel as it moves in its orbital path.

15. In a machine for applying heel breast covering flaps to shoes, means for positioning and clamping a shoe having an attached heel and a flap which is split from the outsole of the shoe, a carrier, a roll which is rotatably mounted in the carrier and comprises a spring embedded in rubber, and means for operating said carrier to cause the roll to move in an orbital path portions of which extend generally lengthwise of the shank of the outsole of the shoe and other portions of which extend generally lengthwise of the breast corners of the heel to cause said roll to conform to the shoe and to rotate with a considerable amount of wiping action over the flap to apply a portion of said flap to the shank of said outsole and to apply another portion of the flap to the breast of the heel.

16. In a machine for applying heel breast covering flaps to shoes, means for positioning and clamping a shoe having an attached heel and a flap which is split from the outsole of the shoe, a carrier, rotors which are mounted in the carrier and have a common axis, an applicator comprising a rubber roll in which is embedded a coil spring opposite ends of which are attached respectively to the rotors, and means for moving the carrier about parallel axes to move said rotors in orbital paths at opposite sides of the shoe and portions of which extend generally lengthwise of the shank of the shoe whereby to cause a portion of the flap to be applied to said shank and other portions of which extend generally lengthwise of the breast edges of the heel to cause another portion of the flap to be applied to the breast of the heel.

17. In a flap applying machine, a support for a shoe, a carrier, a rigid boning tool having an edge, means for yieldingly connecting opposite ends of the tool to the carrier, and means for moving the carrier in an orbital path to cause said edge of the tool to wipe the end portion of a heel breast covering flap, which is split from the outsole of said shoe, against the tread end portion of the breast of the heel of the shoe and into an angle formed by said tread end portion and a projecting portion of a top lift of the heel.

References Cited in the file of this patent

UNITED STATES PATENTS

| Number | Name | Date |
|---|---|---|
| Re. 9,098 | Ethridge | Feb. 24, 1880 |
| 259,811 | Burbank | June 20, 1882 |